(12) United States Patent
Miyamoto (10) Patent No.: US 6,414,777 B1
(45) Date of Patent: Jul. 2, 2002

(54) OPTICAL DEFLECTION/SCANNING APPARATUS

(75) Inventor: Hideyuki Miyamoto, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/084,367

(22) Filed: May 27, 1998

(30) Foreign Application Priority Data

May 29, 1997 (JP) ............................................. 9-155867

(51) Int. Cl.$^7$ ............................................. G02B 36/08
(52) U.S. Cl. ........................ 359/198; 359/212; 359/216; 360/99.08; 310/90.5; 310/261
(58) Field of Search ................................. 359/197, 198, 359/199, 200, 216, 217, 218, 219; 310/40 R, 46, 66, 67 R, 90, 261, 91, 90.5; 360/99.08

(56) References Cited

U.S. PATENT DOCUMENTS

| | | | |
|---|---|---|---|
| 5,446,610 A | * | 8/1995 | Elsaesser et al. ........ 360/99.08 |
| 5,650,674 A | * | 7/1997 | Hayashi ........................ 310/51 |
| 5,744,881 A | * | 4/1998 | Ishizuka et al. ........... 310/67 R |

* cited by examiner

Primary Examiner—Cassandra Spyrou
Assistant Examiner—Euncha Cherry
(74) Attorney, Agent, or Firm—Fitzpatrick, Cella, Harper & Scinto (57) ABSTRACT

An optical deflection/scanning apparatus includes a rotary polygon mirror for reflectively scanning a light beam and a motor for rotating the rotary polygon mirror. The motor has a rotor yoke and a rotor magnet. The rotor magnet is attached inside of the rotor yoke such that a curved portion of the rotor yoke projects vertically from one end of the rotor magnet so as to prevent any trouble caused on the lower end of the rotor due to a centrifugal force during rotation of the rotary polygon mirror.

15 Claims, 10 Drawing Sheets

OPTICAL DEFLECTION/SCANNING APPARATUS

BACKGROUND OF THE INVENTION

1. Field of the Invention

The present invention relates to an optical deflection/scanning apparatus used in an image forming apparatus such as a laser beam printer or a laser facsimile device.

2. Related Background Art

An optical deflection/scanning apparatus used in an image forming apparatus such as a laser beam printer or a laser facsimile apparatus irradiates a light beam such as a laser beam on a rotary polygon mirror, and deflects and scans the beam by high-speed rotation of the rotary polygon mirror. The scanning beam obtained in this manner is formed into an electrostatic latent image on a photosensitive body serving as a recording medium. on a rotary drum. The electrostatic latent image on the photosensitive body is visualized into a toner image by a developing unit. The toner image is transferred to a recording medium such as a recording paper sheet and sent to a fixing unit. The toner on the recording medium is heated and fixed to print the image.

In recent years, as the speed of the optical deflection/scanning apparatus increases, one with a rotary polygon mirror whose rotational speed exceeds 5,000 rpm is developed.

Figure 1:
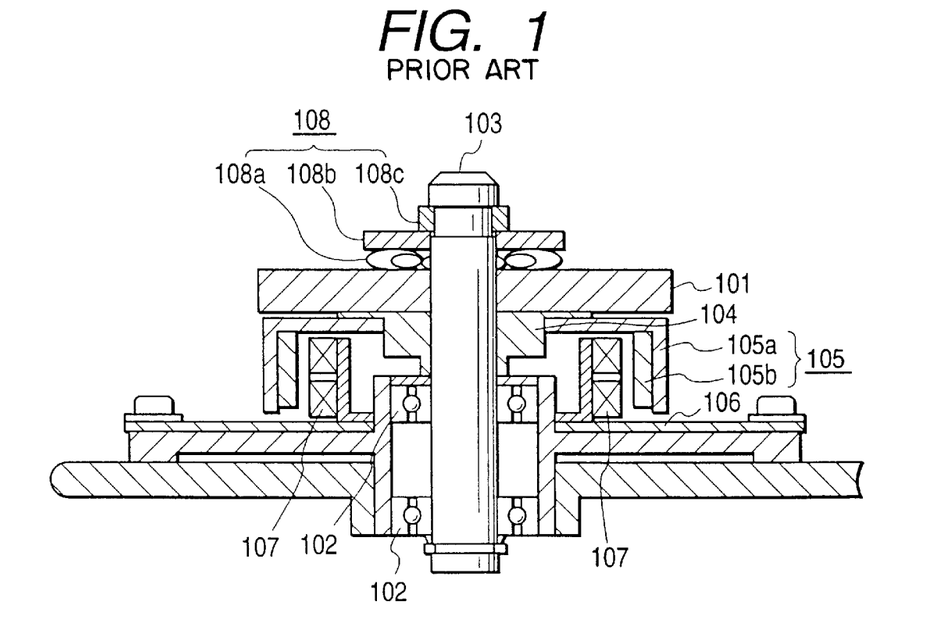
FIG. 1 is a schematic sectional view showing the main part of a conventional optical deflection/scanning apparatus.

As shown in FIG. 1, a motor for rotating the rotary polygon mirror comprises a rotating shaft 103 supported by an optical box of the optical deflection/scanning apparatus via a ball bearing 102, a rotor 105 made up of a rotor yoke 105a integrally coupled to a flange member 104 integral with the rotating shaft 103 and a rotor magnet 105b, and a stator 107 fixed to a motor board 106. A rotary polygon mirror 101 is pressed against the flange member 104 by an elastic press mechanism 108 made up of a leaf spring 108a, a washer 108b, and a G-ring 108c, and is integrated with the rotating shaft 103 and the rotor 105.

When the stator 107 is excited by a driving current supplied from a driving circuit on the motor board 106, the rotor 105 rotates at a high speed together with the rotary polygon mirror 101 to deflect and scan a light beam irradiated on the rotary polygon mirror 101.

The rotor 105 is constituted by the rotor yoke 105a for ensuring a necessary structure strength (to be described later), and the rotor magnet 105b with magnetic properties. A material for the rotor yoke 105a is generally a metal or a reinforced plastic. As the rotor magnet 105b, a ferrite magnet, or a plastic magnet or so-called rubbernet prepared by kneading a ferrite in a resin and integrally molding them is used. The assembly of the rotor magnet 105b in the rotor yoke 105a is performed by fixing the rotor magnet 105b to the inner circumferential surface of the rotor yoke 105a using an adhesive, or press-fitting the rotor magnet 105b inside the rotor yoke 105a.

Upon rotating the motor at a high speed, a large centrifugal force is generated in the rotor. If the rotor does not have a strength large enough to stand this force, the rotor may fracture, be divided, and scatter during rotation. Since the rotor magnet made of a rubbernet, a plastic magnet, or the like cannot be expected to have such a large strength, the rotor magnet is attached to the inside of the rotor yoke having a sufficient strength to form a strong structure which can stand the centrifugal force.

According to the prior art, however, even if the rotor magnet is attached to the inside of the rotor yoke having a sufficient strength, the lower end of the rotor magnetic easily cracks. This may lead division and fracture of the rotor magnet.

Figure 2A:
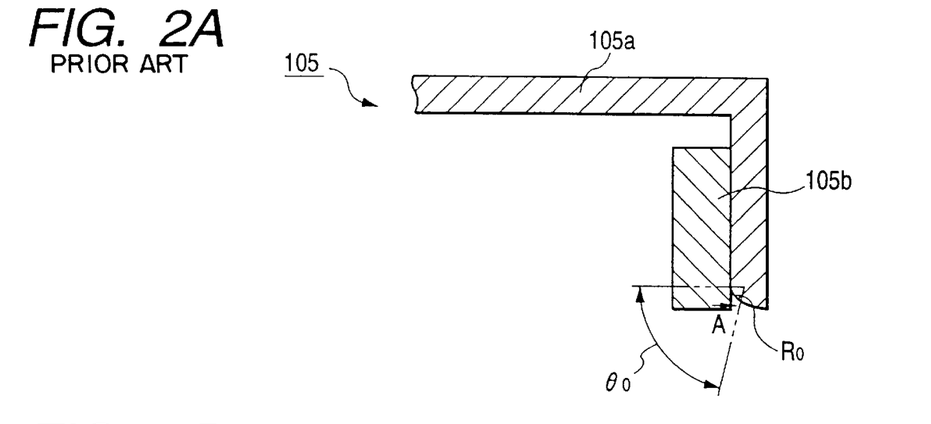
FIGS. 2A and 2B are views for explaining the state wherein a rotor magnet cracks.
Figure 2B:
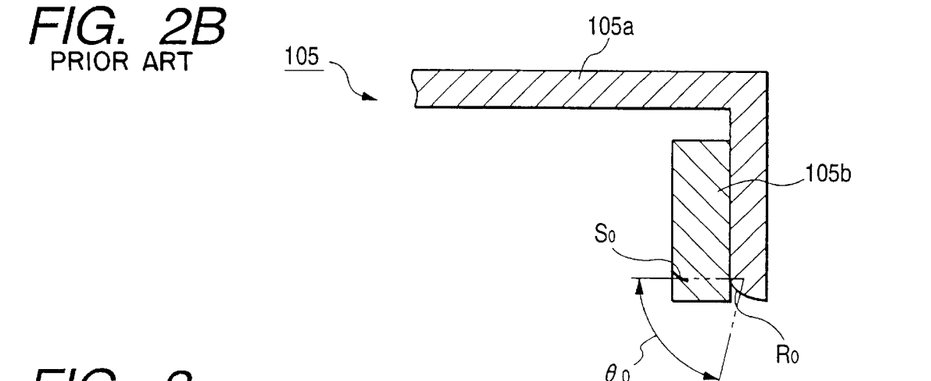

More specifically, as shown in FIG. 2A, the rotor yoke 105a is generally made of a sheet metal. A curved portion $R_0$ is formed at the lower end of the rotor yoke 105a as a press sag in processing the sheet metal. The outer circumferential surface of the lower end of the rotor magnet 105b cannot tightly contact the rotor yoke 105a, and a gap is made between the rotor yoke 105a and the rotor magnet 105b. When the motor rotates in this state, a centrifugal force A directly acts on the lower end of the rotor magnet 105b. As shown in FIG. 2B, a tensile stress is generated on the inner circumferential surface of the rotor yoke 105a near the start of the curved portion $R_0$ of the rotor yoke 105a, i.e., at one end at a center angle $\theta_0$. Such portions where the tensile stress is generated successively exist in the circumferential direction at the lower end of the rotor magnet 105b. If the tensile stress exceeds the allowable stress of a material for the rotor magnet 105b, a crack $S_0$ is formed. If the crack $S_0$ grows and reaches the outer circumferential surface of the rotor magnet 105b, the lower end of the rotor magnet 105b is divided and fractures. As a result, the lower end of the rotor magnet 105b is lost, the rotation unbalance of the rotor 105 becomes very large, and large vibrations and noise are generated upon high-speed rotation.

Figure 3:
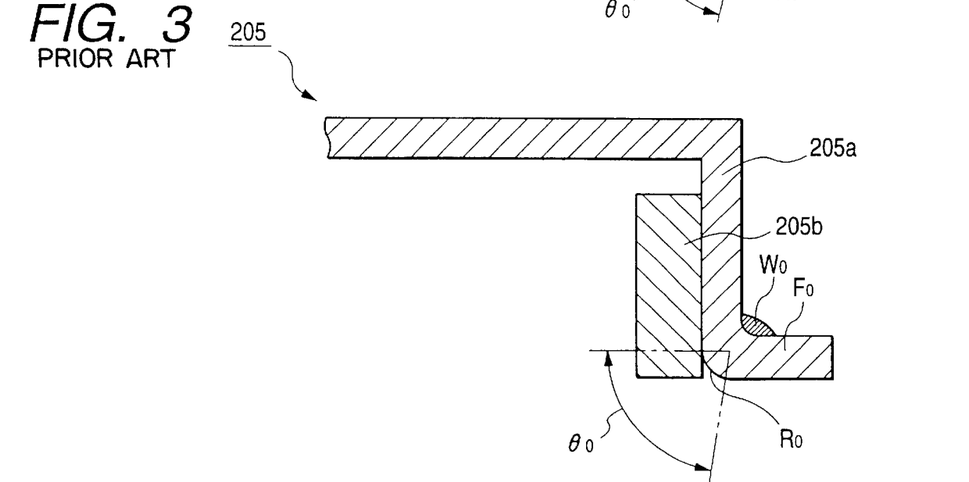
FIG. 3 is a view for explaining the case wherein a flange portion for mounting a weight is formed at a rotor yoke.

FIG. 3 shows the example wherein a flange portion $F_0$ is formed at the lower end of a rotor yoke 205a, and a balance weight $W_0$ is attached to the flange portion $F_0$ in order to correct the rotation unbalance of a rotor 205 (balance correction). In this case, since the lower end of the rotor yoke 205a is bent, a curved portion $R_0$ having a center angle $\theta_0$ larger than that in the example of FIGS. 2A and 2B is easily formed. Therefore, the lower end of a rotor magnet 205b cracks and fractures more easily.

Figure 4A:
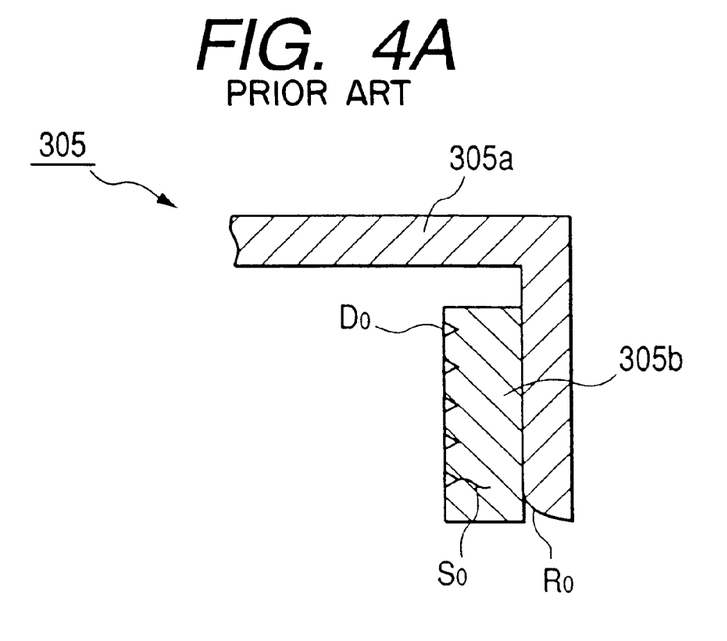
FIGS. 4A and 4B are views for explaining the state wherein the dimple of he rotor magnet cracks.
Figure 4B:
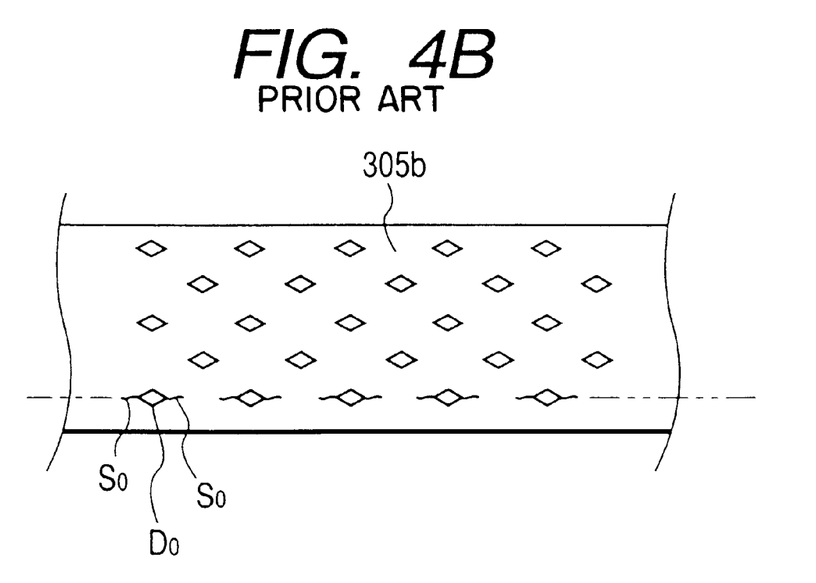

FIGS. 4A and 4B show the example using a rubbernet as a rotor magnet 305b. The rubbernet is rolled by a roller during the manufacturing process. Small antislip projections are formed on the surface of the roller, and dimples $D_0$ are formed on the surface of the rotor magnet 305b by rolling.

Since the dimple $D_0$ is a recess having a quadrangular pyramid shape. Upon generation of the above tensile stress, the stress concentrates at the dimple $D_0$, and the crack $S_0$ is easily formed. Since the dimples $D_0$ are aligned near each other in the circumferential direction at an equal interval, a crack so growing from the edge of a dimple $D_0$ in the circumferential direction is connected to an adjacent crack. In this manner, the cracking and fracture of the lower end of the rotor magnet 305b progress at a breath.

SUMMARY OF THE INVENTION

The present invention has been made in consideration of the above problems of the prior art, and has as its object to provide an optical deflection/scanning apparatus in which the speed of a rotary polygon mirror can be greatly increased while preventing troubles such as separation and fracture of the lower end of the rotor of a motor by a centrifugal force during the rotation of the rotary polygon mirror.

To achieve the above object, according to the present invention, there is provided an optical deflection/scanning apparatus comprising a rotary polygon mirror for reflecting a light beam, and a motor for rotating the rotary polygon mirror, the motor having a rotor yoke with a curved portion at one end, and a rotor magnet attached to an inside of the rotor yoke, wherein the curved portion of the rotor yoke projects from one end of the rotor magnet in a direction of height.

The optical deflection/scanning apparatus may comprise a rotary polygon mirror for reflecting a light beam, and a motor for rotating the rotary polygon mirror, the motor having a rotor yoke with a curved portion at one end, and a rotor magnet attached to an inside of the rotor yoke, wherein one end of the rotor magnet is made locally thin at the same level as the curved portion of the rotor yoke.

The optical deflection/scanning apparatus may comprise a rotary polygon mirror for reflecting a light beam, and a motor for rotating the rotary polygon mirror, the motor having a rotor yoke with a curved portion at one end, and a rotor magnet attached to an inside of the rotor yoke, wherein a gap between one end of the rotor magnet and the curved portion of the rotor yoke is filled with a filler.

The optical deflection/scanning apparatus may comprise a rotary polygon mirror for reflecting a light beam, and a motor for rotating the rotary polygon mirror, the motor having a rotor yoke with a curved portion at one end, and a rotor magnet attached to an inside of the rotor yoke, wherein an array of dimples of the rotor magnet is arranged at a remaining portion except for one end at the same level as the curved portion of the rotor yoke.

The optical deflection/scanning apparatus may comprise a rotary polygon mirror for reflecting a light beam, and a motor for rotating the rotary polygon mirror, the motor having a rotor yoke with a curved portion at one end, and a rotor magnet attached to an inside of the rotor yoke, wherein an alignment direction of an array of dimples of the rotor magnet is inclined at a predetermined angle with respect to a circumferential direction of the rotor magnet.

The optical deflection/scanning apparatus may comprise a rotary polygon mirror for reflecting a light beam, and a motor for rotating the rotary polygon mirror, the motor having a rotor yoke with a curved portion at one end, and a rotor magnet attached to an inside of the rotor yoke, wherein an array of dimples of the rotor magnet is perpendicular to a circumferential direction of the rotor magnet.

If the lower end of the rotor magnet overlaps the curved portion of the lower end of the rotor yoke, a gap is formed between them. The lower end of the weak rotor magnet cannot be supported, is cracked by the centrifugal force during the rotation of the motor, and divided and fractured. For this reason, by setting the attaching position of the rotor magnet high so as to make the curved portion of the rotor yoke project from the lower end of the rotor magnet, the entire outer surface of the rotor magnet tightly contacts the rotor yoke. With this structure, the gap between the rotor magnet and the rotor yoke is eliminated, and, for example, the rotor magnet will not fracture by the centrifugal force. By preventing troubles caused by the centrifugal force, the speed of the optical deflection/scanning apparatus can greatly increase.

If the optical deflection/scanning apparatus comprises a rotary polygon mirror for reflecting a light beam, and a motor for rotating the rotary polygon mirror, the motor has a rotor yoke with a curved portion at one end, and a rotor magnet attached to the inside of the rotor yoke, and one end of the rotor magnet is made locally thin at the same level as the curved portion of the rotor yoke, the mass of the rotor magnet can be locally reduced at a portion where the rotor magnet overlaps the curved portion of the rotor yoke, thereby preventing a large centrifugal force from acting on this portion. Accordingly, for example, the rotor magnet will not fracture by the centrifugal force.

If the optical deflection/scanning apparatus comprises a rotary polygon mirror for reflecting a light beam, and a motor for rotating the rotary polygon mirror, the motor has a rotor yoke with a curved portion at one end, and a rotor magnet attached to the inside of the rotor yoke, and the gap between one end of the rotor magnet and the curved portion of the rotor yoke is filled with a filler, the rotor magnet can be satisfactorily supported via the filler between the curved portion of the rotor yoke and the rotor magnet. The cracks and the like will not be formed by the centrifugal force.

If the optical deflection/scanning apparatus comprises a rotary polygon mirror for reflecting a light beam, and a motor for rotating the rotary polygon mirror, the motor has a rotor yoke with a curved portion at one end, and a rotor magnet attached to the inside of the rotor yoke, and an array of dimples of the rotor magnet is arranged at a remaining portion except for one end at the same level as the curved portion of the rotor yoke, for example, the rotor magnet will not fracture by the centrifugal force because no dimple at which the tensile stress concentrates exists at the same level as the curved portion of the rotor yoke.

If the optical deflection/scanning apparatus comprises a rotary polygon mirror for reflecting a light beam, and a motor for rotating the rotary polygon mirror, the motor has a rotor yoke with a curved portion at one end, and a rotor magnet attached to the inside of the rotor yoke, and the alignment direction of an array of dimples of the rotor magnet is inclined at a predetermined angle with respect to the circumferential direction of the rotor magnet, the pitch of the dimple at which the tensile stress concentrates is increased in the circumferential direction of the rotor magnet. As a result, the cracks formed at the dimples will not be connected to prevent, e.g., the fracture of the rotor magnet.

If the optical deflection/scanning apparatus comprises a rotary polygon mirror for reflecting a light beam, and a motor for rotating the rotary polygon mirror, the motor has a rotor yoke with a curved portion at one end, and a rotor magnet attached to the inside of the rotor yoke, and the alignment direction of an array of dimples of the rotor magnet is perpendicular to the circumferential direction of the rotor magnet, the longitudinal direction of the dimple at which the tensile stress concentrates is made incoincident with the circumferential direction of the rotor magnet. With this arrangement, a large crack at the dimple will not be formed to prevent, e.g., the fracture of the rotor magnet.

BRIEF DESCRIPTION OF THE DRAWINGS

FIGS. 5A and 5B are views showing the main part of an optical deflection/scanning apparatus according to the first imbodiment, in which

FIGS. 8A and 8B are views showing the main part of the fourth embodiment in which

FIGS. 9 and 9B are views showing the main part of the fifth embodiment, in which

FIGS. 10A and 10B are views showing the main part of the sixth embodiment, in which

DETAILED DESCRIPTION OF THE PREFERRED EMBODIMENTS

Embodiments of an optical deflection/scanning apparatus of the present invention will be described with reference to the accompanying drawings.

Figure 5A:
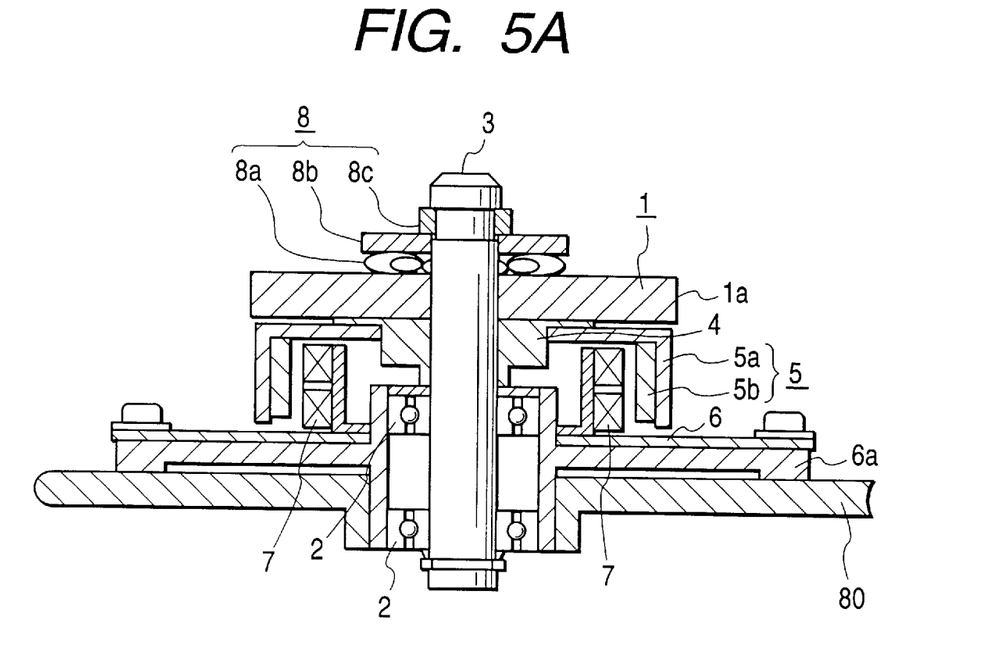
FIG. 5A is a schematic sectional view.
Figure 5B:
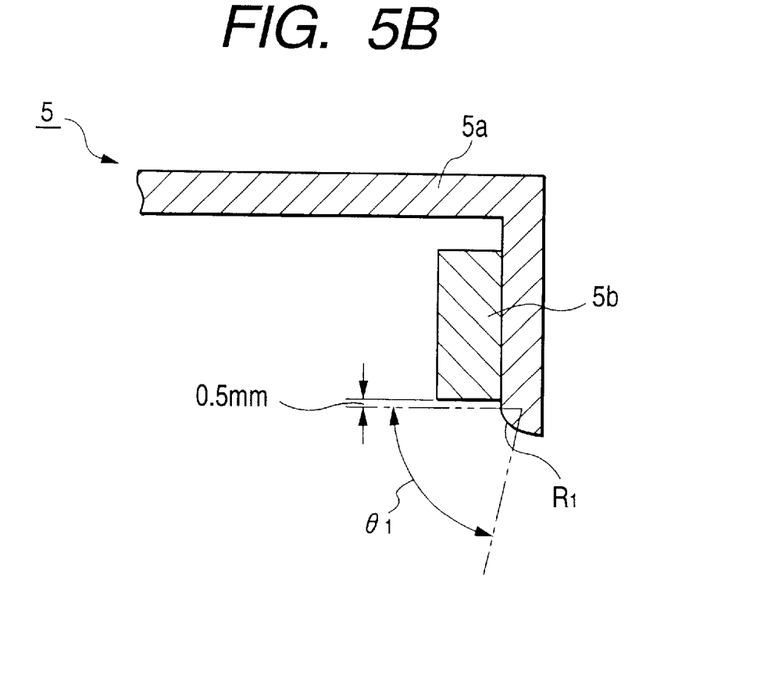
FIG. 5B is a partial sectional view showing part of a rotor.

FIGS. 5A and 5B show the main part of an optical deflection/scanning apparatus according to the first embodiment. The optical deflection/scanning apparatus comprises a rotary polygon mirror 1 (to be described later) having a reflecting surface 1a for reflecting a light beam such as a laser beam generated from a light source 81 (see FIG. 13) toward an imaging lens system 82, a rotating shaft 3 supported by an optical box 80 via a bearing 2, a flange member 4 formed integrally with the rotating shaft 3, a rotor 5 made up of a rotor yoke 5a suspended from the flange member 4 and a rotor magnet 5b, and a stator 7 which stands on a motor board 6 and constitutes a motor together with the rotor 5. The motor board 6 is attached to the optical box 80 together with a base 6a by screws.

The rotary polygon mirror 1 is mounted on the upper surface (FIG. 5A) of the flange member 4, pressed against the flange member 4 by an elastic press mechanism 8 made up of a leaf spring 8a, a washer 8b, a G-ring 8c, and the like, and integrally coupled to the rotor 5 via the flange member 4.

When the stator 7 is excited by a driving current supplied from a driving circuit on the motor board 6, the rotor 5 rotates together with the rotary polygon mirror 1. Upon the rotation of the rotary polygon mirror 1, a light beam irradiated on it is deflected and scanned in the main scanning direction.

The rotor 5 is constituted by the sheet-metal rotor yoke 5a for ensuring a necessary structure strength, and the magnetic rotor magnet 5b. A material for the rotor yoke 5a is generally a metal or a reinforced plastic. As the rotor magnet 5b, a ferrite magnet, or a plastic magnet or so-called rubbernet (rubber magnet) prepared by kneading a ferrite in a resin and integrally molding them is used. The assembly of the rotor magnet 5b in the rotor yoke 5a is performed by fixing the rotor magnet 5b to the inner circumferential surface of the rotor yoke 5a using an adhesive, or press-fitting the rotor magnet 5b inside the rotor yoke 5a.

Upon rotating the motor at a high speed, a large centrifugal force is generated in the rotor. If the rotor does not have a strength large enough to stand this force, the rotor may fracture, be divided, and scatter during rotation. Since the rotor magnet made of a rubbernet or the like cannot be expected to have such a large strength, the rotor magnet is attached to the inside of the rotor yoke having a sufficient strength to stand the centrifugal force.

Even if the rotor magnet 5b is attached to the inside of the rotor yoke 5a having a sufficient strength, a gap is formed between the rotor yoke 5a and the rotor magnet 5b owing to the presence of a curved portion $R_1$ at the lower end of the sheet-metal rotor yoke 5a, so the rotor magnet 5b may not be satisfactorily reinforced.

For this reason, the attaching position of the rotor magnet 5b to the rotor yoke 5a is changed such that the lower end of the rotor magnet 5b is positioned by at least about 0.5 mm above the upper end of the curved portion $R_1$ of the rotor yoke 5a, i.e., the starting point of a center angle $\theta_1$ of the curved portion $R_1$. The curved portion $R_1$ of the rotor yoke 5a is projected from the lower end of the rotor magnet 5b. In this manner, the gap between the lower end of the rotor magnet 5b and the rotor yoke 5a will not be formed to allow the entire outer circumferential surface of the rotor magnet 5b to tightly contact the inner circumferential surface of the rotor yoke 5a.

In other words, the rotor magnet is brought into tight contact with the inner circumferential surface of the rotor yoke to the lower end, and is supported. With this structure, generation of a local tensile stress due to the centrifugal force, as in the prior art, is prevented. The separation and fracture of the lower end of the rotor magnet during the rotation of the rotary polygon mirror can be effectively avoided. By preventing troubles caused by the centrifugal force, the speed of the optical deflection/scanning apparatus can be greatly increased.

Figure 6:
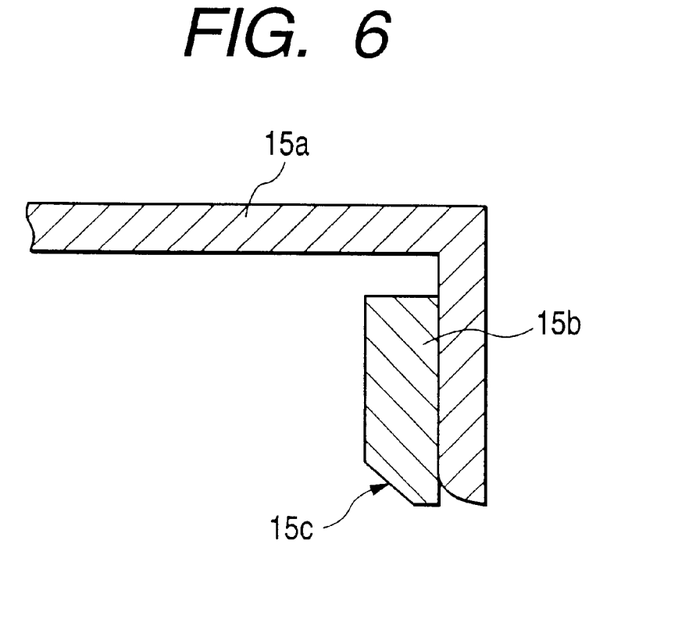
FIG. 6 is a partial sectional view showing the second embodiment.

Instead of shifting the attaching position of the rotor magnet in the direction of height, a lower end 15c of a rotor magnet 15b made of a plastic magnet or rubbernet may be chamfered to make this portion thin and reduce the mass, as in the second embodiment shown in FIG. 6. By locally reducing the mass of the rotor magnet 15b at a portion where the rotor magnet 15b overlaps the curved portion of a sheet-metal rotor yoke 15a, the centrifugal force acting on this portion is reduced to prevent generation of a tensile stress which may crack the rotor.

Note that the present invention is not limited to chamfering and may employ another means as far as the effect of reducing the mass of the lower end of the rotor magnet is obtained.

Figure 7:
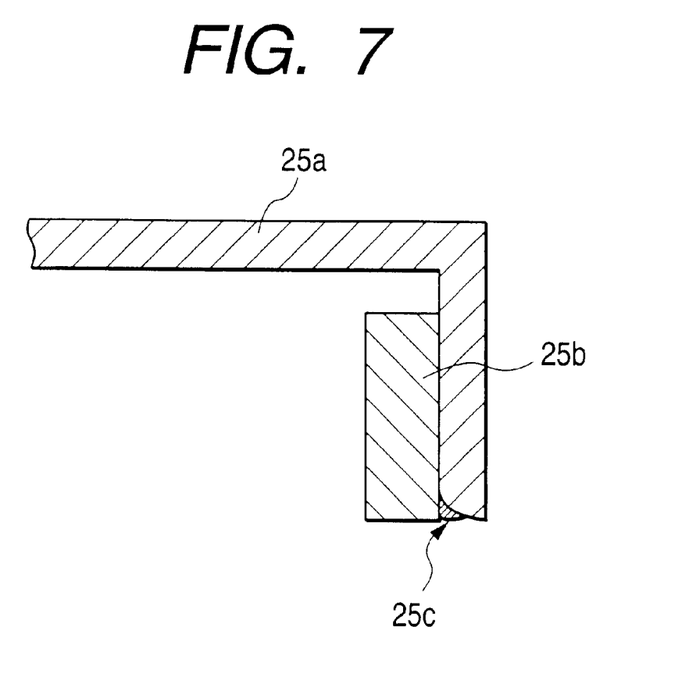
FIG. 7 is a partial sectional view showing the third embodiment.

A filler 25c such as an adhesive may be filled in a gap formed between the lower end of a rotor magnet 25b made of a plastic magnet or rubbernet and a sheet-metal rotor yoke 25a, as in the third embodiment shown in FIG. 7. As the filler 25c, any solid material is available as long as it can transmit the centrifugal force acting on the lower end of the rotor magnet 25b to the rotor yoke 25a. If the rotor yoke 25a receives the centrifugal force acting on the lower end of the rotor magnet 25b via the filler 25c, a tensile stress which may crack the lower end of the rotor magnet 25b will not be generated.

Figure 8A:
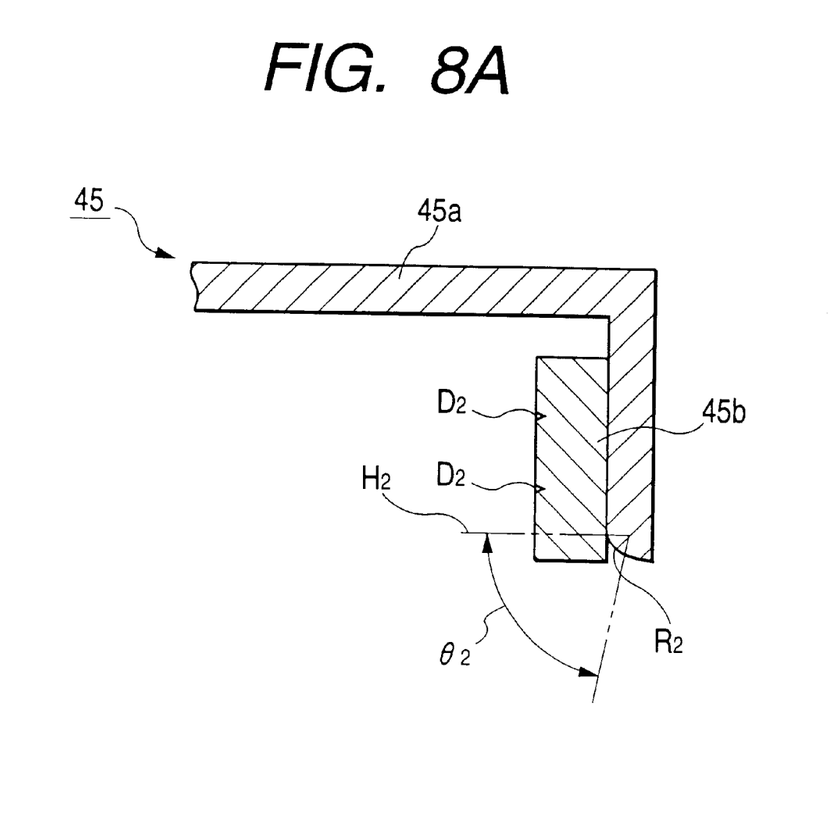
FIG. 8A is a partial sectional view.
Figure 8B:
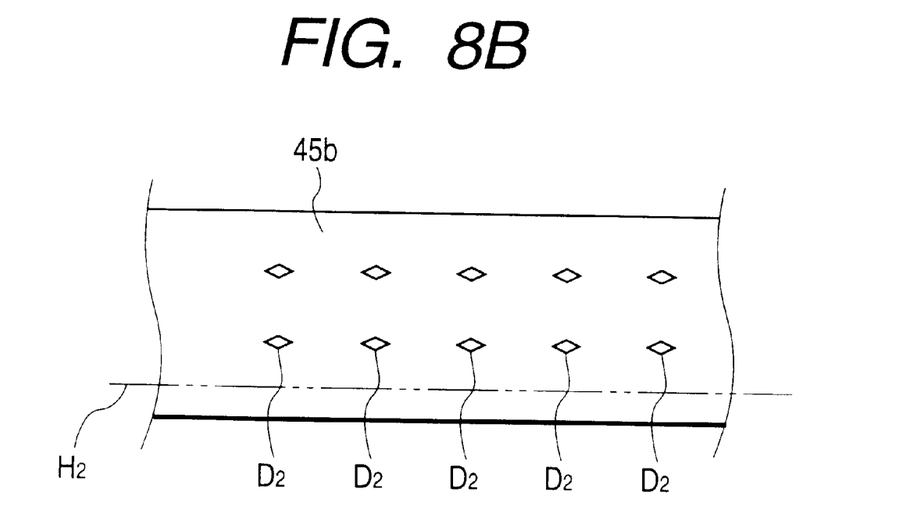
FIG. 8B is a developed view showing the array of dimples of the rotor magnet.

FIGS. 8A and 8B show part of a rotor 45 of an optical deflection/scanning apparatus according to the fourth embodiment. In the fourth embodiment, a rotor magnet 45b attached to the inside of a sheet-metal rotor yoke 45a is made of a rubbernet, and its inner circumferential surface has dimples $D_2$ formed by a roller. When the centrifugal force acts on the rotor magnet 45b made of a rubbernet, the stress locally concentrates at the dimples $D_2$. If the support force of the back side of the rotor magnet 45b runs short owing to a curved portion $R_2$ of the rotor yoke 45a, the rotor magnet 45b may crack and fracture. Accordingly, while the rotor magnet 45b is rolled, arrays of dimples $D_2$ (dimple arrays) by the roller are formed except for the lower end of the rotor magnet 45b, i.e., a portion below a level $H_2$ as the starting point of a center angle $\theta_2$ of the curved portion $R_2$ of the rotor magnet 45b.

In this manner, by forming the dimples at which the tensile stress easily concentrates so as not to position at the lower end of the rotor magnet, for example, the fracture of the rotor magnet caused by the centrifugal force can be effectively avoided.

The remaining arrangement is the same as in the first embodiment.

Figure 9A:
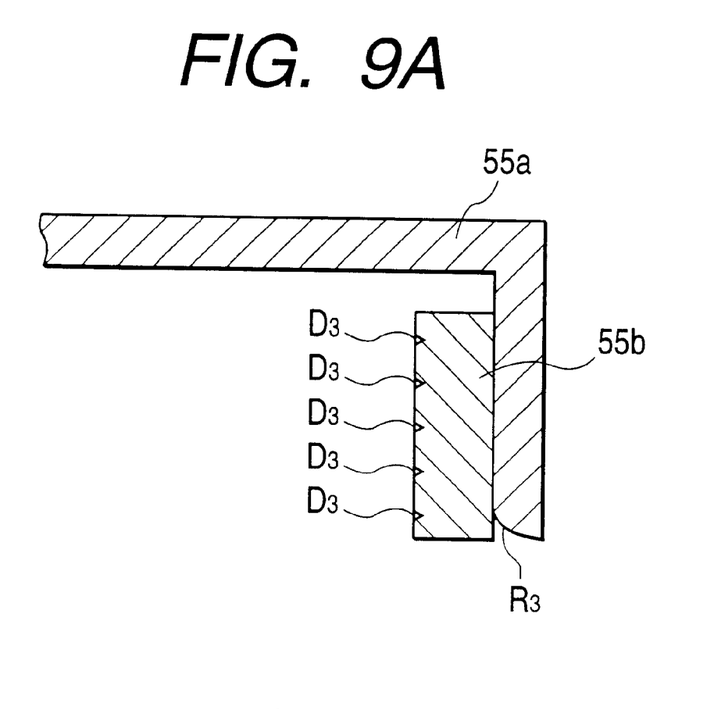
FIG. 9A is a partial sectional view.
Figure 9B:
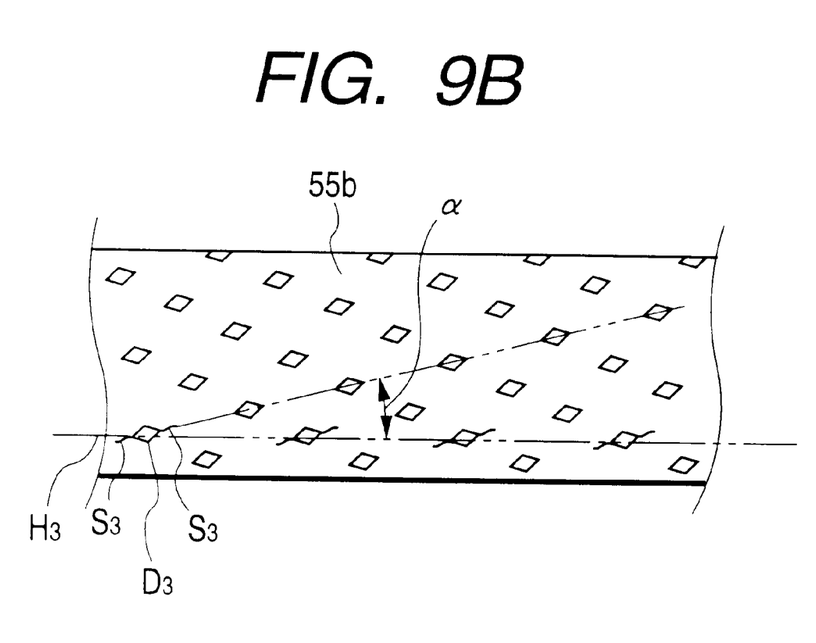
FIG. 9B is a developed view showing the array of dimples of the rotor magnet.

In place of forming the dimples so as not to position at the lower end of the rotor magnet made of a rubbernet, arrays of dimples $D_3$ (dimple arrays) each generally having a rhombic shape may be inclined by an angle $\alpha$, and the pitch of the dimple $D_3$ may be increased in the circumferential direction at the lower end of a rotor magnet 55b positioned below the same level $H_3$ as a curved portion $R_3$ of a sheet-metal rotor yoke 55a, as in the fifth embodiment shown in FIGS. 9A and 9B. The dimple array is in a direction along which the long diagonal lines of the rhombic dimples are connected to each other.

Even if the tensile stress concentrates at the dimples $D_3$ to form cracks $S_3$, the cracks $S_3$ are not connected to each other not to divide and fracture the lower end of the rotor magnet 55b because adjacent dimples $D_3$ are apart from each other.

Note that the present invention is not limited to the method of inclining the dimple array, and can employ any method as long as the dimple pitch increases in the circumferential direction at the lower end of the rotor magnet.

Figure 10A:
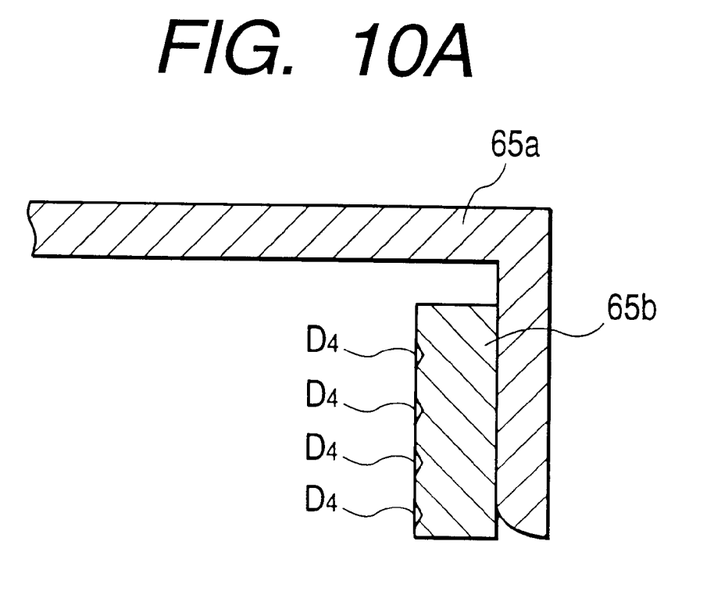
FIG. 10A is a partial sectional view.
Figure 10B:
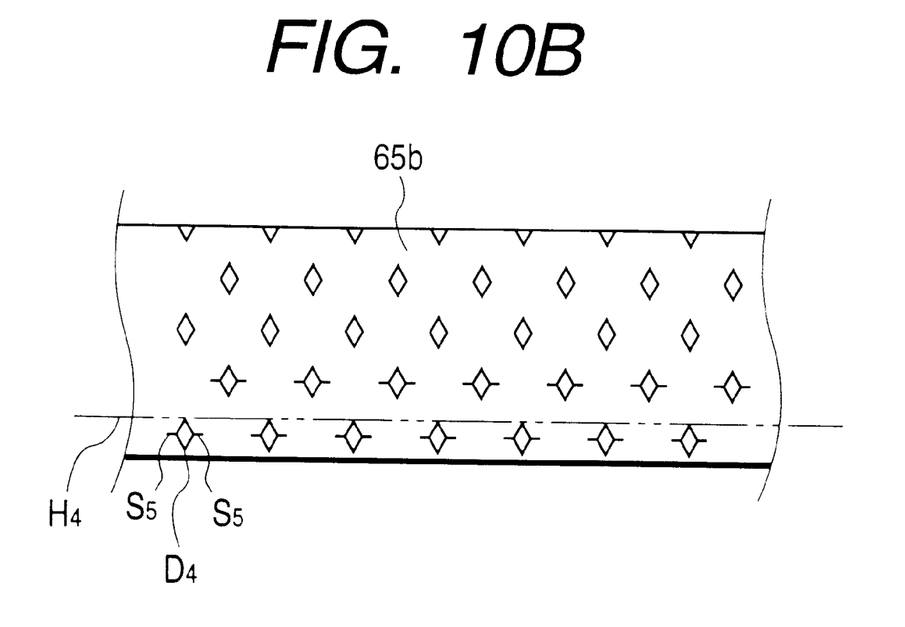
FIG. 10B is a developed view showing the array of dimples of the rotor magnet.
Figure 11A:
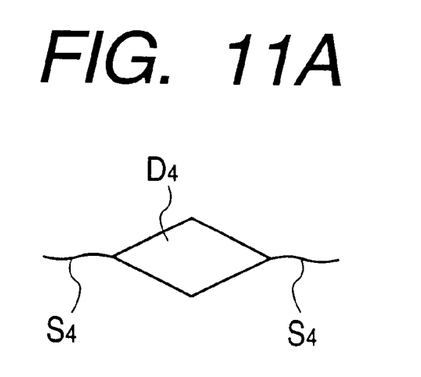
FIGS. 11A and 11B are views for explaining a crack formed at rhombic dimple.

As in the sixth embodiment shown in FIGS. 10A and 10B, the direction of arrays of dimples $D_4$ (dimple arrays) may be made perpendicular to the circumferential direction of a rotor magnet 65b made of a rubbernet. If the longitudinal direction of the rhombic dimple $D_4$ coincides with the circumferential direction of the rotor magnet 65b, a large crack $S_4$ is formed, as shown in FIG. 11A. If the widthwise direction of the dimple $D_4$ coincides with an axial direction perpendicular to the circumferential direction of the rotor magnet 65b, a crack $S_5$ is small, as shown in FIG. 11B.

Figure 11B:
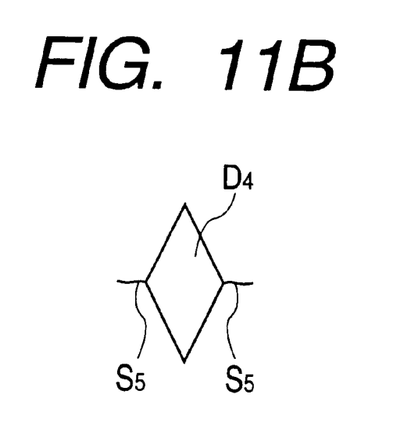

With the arrangement shown in FIG. 11B, even if cracks are formed at dimples, they are not connected to each other in the circumferential direction of the rotor magnet to prevent division and fracture of the lower end of the rotor magnet.

Figure 12:
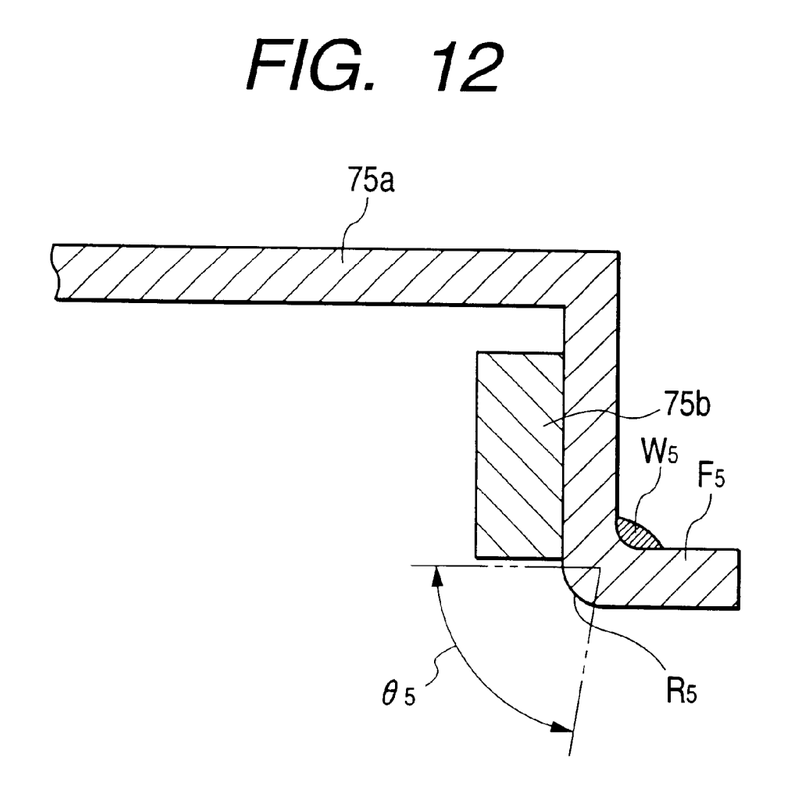
FIG. 12 is a view for explaining the case wherein a flange portion for mounting a weight is formed at a rotor yoke.

FIG. 12 shows the case wherein a flange portion $F_5$ for attaching a balance correction weight $W_5$ thereto is formed at a sheet-metal rotor yoke 75a to which a rotor magnet 75b made of a plastic magnet or rubbernet is attached. Since the lower end of the rotor yoke 75a is bent outward by a bending process, a curved portion $R_5$ larger than those of the rotor yokes shown in FIGS. 5A and 5B to 10A and 10B is formed. In this case, the first embodiment is particularly effective because the attaching position of the rotor magnet 75b is set high so as to position the lower end of the rotor magnet 75b about 0.5 mm above the starting point of a center angle $\theta_5$ of the curved portion $R_5$. In the second to sixth embodiments, a flange portion for attaching a balance correction weight thereto can be formed outside the curved portion of the rotor yoke, as a matter of course.

Figure 13:
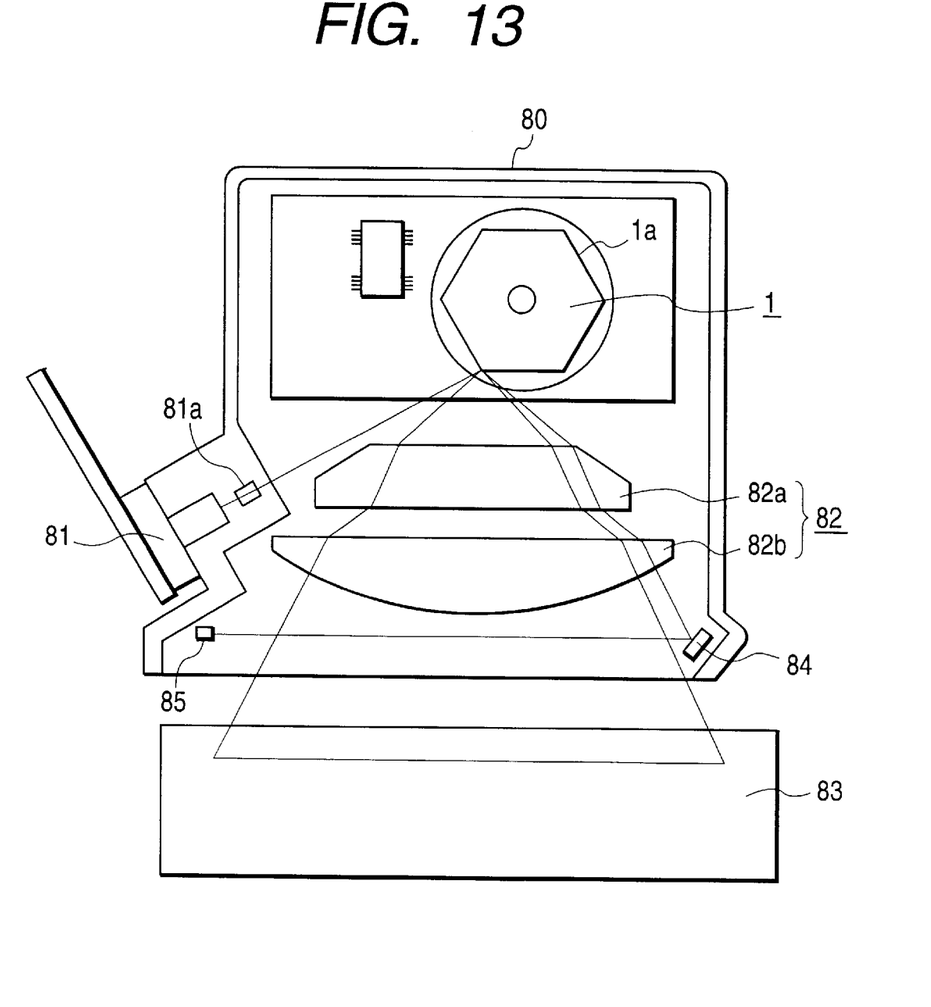
FIG. 13 a view for explaining the whole optical deflection/scanning apparatus.

FIG. 13 shows the whole optical deflection/scanning apparatus. This apparatus comprises the light source 81 for generating a light beam such as a laser beam, and a cylindrical lens 81a for linearly focusing the light beam on the reflecting surface 1a of the rotary polygon mirror 1. The light beam is deflected and scanned by the rotation of the rotary polygon mirror 1, and formed into an image on a photosensitive member 83 on a rotary drum via the imaging lens system 82. The imaging lens system 82 comprises a spherical lens 82a, a toric lens 82b, and the like. The imaging lens system 82 has a so-called f-$\theta$ function of correcting, e.g., the scanning speed of a point image formed on the photosensitive member 83 serving as a recording medium. The optical deflection apparatus described in each of the first to sixth embodiments is employed in the optical deflection/scanning apparatus shown in FIG. 13.

When the rotary polygon mirror 1 is rotated by the motor, the reflecting surface 1a rotates at an equal speed about the axis of the rotary polygon mirror 1. The angle defined by the optical path of the light beam generated by the light source 81 and focused by the cylindrical lens 81a in the above manner and the normal line of the reflecting surface 1a of the rotary polygon mirror 1, i.e., the incident angle of the light beam on the reflecting surface 1a changes with time during rotation of the rotary polygon mirror 1. Similarly, the reflection angle changes. Therefore, a point image formed by focusing the light beam on the photosensitive member 83 moves in the axial direction (main scanning direction) of the rotary drum.

The imaging lens system 82 focuses the light beam reflected by the rotary polygon mirror 1 on the photosensitive member 83 to form a point image having a predetermined spot shape. At the same time, the imaging lens system 82 keeps the scanning speed of the point image in the main scanning direction constant.

The point image formed on the photosensitive member 83 forms an electrostatic latent image upon main scanning by the rotation of the rotary polygon mirror 1 and subscanning by the rotation of the photosensitive member 83 about the shaft of the rotary drum.

A corona discharge unit for uniformly charging the surface of the photosensitive member 83, a developing unit for visualizing the electrostatic latent image formed on the surface of the photosensitive member 83 into a toner image, a transfer corona discharge unit for transferring the toner image to a recording paper sheet, and the like (none of them are shown) are arranged around the photosensitive member 83. Recording information by the light beam generated by the light source 81 is printed on a recording paper sheet or the like.

A detection mirror 84 reflects the light beam on the upstream side in the main scanning direction with respect to the optical path of the light beam incident on the write start position of recording information on the surface of the photosensitive member 83, and guides the light beam to the light-receiving surface of a light-receiving element 85 having a photodiode or the like. When the light-receiving surface is irradiated with the light beam, the light-receiving element 85 outputs a scanning start signal for detecting the scanning start position (write start position).

The light source 81 generates a light beam in correspondence with a signal supplied from a processing circuit for processing information from a host computer. The signal supplied to the light source 81 corresponds to information to be written on the photosensitive member 83. The processing circuit supplies a signal representing information corresponding to one scanning line as a locus formed by a point image formed on the surface of the photosensitive member 83, to the light source 81 as one unit. The information signal is transmitted in synchronism with a scanning start signal supplied from the light-receiving element 85.

Note that the rotary polygon mirror 1, the imaging lens system 82, and the like are housed in the optical box 80, and the light source 81 and the like are attached to the side wall of the optical box 80. The rotary polygon mirror 1, the imaging lens system 82, and the like are incorporated in the optical box 80, and then a lid (not shown) is mounted on the upper opening of the optical box 80.

With the above arrangement, the present invention exhibits the following effects.

The division and fracture of the lower end of the rotor of the motor caused by the centrifugal force during the rotation of the rotary polygon mirror can be effectively avoided. This greatly increases the speed of the rotary polygon mirror and contributes to improvement in the performance of the image forming apparatus.

What is claimed is:

1. An optical deflection apparatus comprising:

a deflector for deflecting a light beam; and a motor for rotating said deflector around a rotation axis;

wherein said motor includes a rotor yoke having a parallel portion parallel to said rotation axis, and a magnet arranged at an inside of said parallel portion; and wherein said parallel portion has a curved portion on an inner surface that is curved toward an end of said parallel portion from the inside to an outside, and said magnet is arranged on the inner surface before a position where said curved portion begins.

2. An apparatus according to claim 1, wherein said deflector is a rotary polygon mirror.

3. An apparatus according to claim 1, wherein said rotor yoke is made of a sheet metal.

4. An apparatus according to claim 1, wherein said magnet is one of a plastic magnet and a rubbernet.

5. An apparatus according to claim 1, further comprising a flange portion for mounting a balance correction weight outside said curved portion of said rotor yoke.

6. An optical deflection/scanning apparatus comprising:

a light source;

a deflector for deflecting a light beam from said light source;

an optical system for condensing the light beam deflected by said deflector on a predetermined surface; and a motor for rotating said deflector around a rotation axis;

wherein said motor includes a rotor yoke having parallel portion parallel to said rotation axis, and a magnet arranged at an inside of said parallel portion; and wherein said parallel portion has a curved portion on an inner surface that is curved toward an end of said parallel portion from the inside to an outside, and said magnet is arranged on the inner surface before a position where said curved portion begins.

7. An apparatus according to claim 6, wherein said deflector is a rotary polygon mirror.

8. An apparatus according to claim 6, wherein said rotor yoke is made of a sheet metal.

9. An apparatus according to claim 6, wherein said magnet is one of a plastic magnet and a rubbernet.

10. An apparatus according to claim 6, further comprising a flange portion for mounting a balance correction weight outside said curved portion of said rotor yoke.

11. An image forming apparatus comprising:

a light source;

a recording medium;

a deflector for deflecting a light beam from said light source;

an optical system for condensing the light beam deflected by said deflector on said recording medium; and a motor for rotating said deflector around a rotation axis;

wherein said motor includes a rotor yoke having a parallel portion parallel to said rotation axis, and a magnet arranged at an inside of said parallel portion; and wherein said parallel portion has a curved portion on an inner surface that is curved toward an end of said parallel portion from the inside to an outside, and said magnet is arranged on the inner surface before a position where said curved portion begins.

12. An apparatus according to claim 11, wherein said deflector is a rotary polygon mirror.

13. An apparatus according to claim 11, wherein said rotor yoke is made of a sheet metal.

14. An apparatus according to claim 11, wherein said magnet is one of a plastic magnet and a rubbernet.

15. An apparatus according to claim 11, further comprising a flange portion for mounting a balance correction weight outside said curved portion of said rotor yoke.

* * * * *

UNITED STATES PATENT AND TRADEMARK OFFICE
CERTIFICATE OF CORRECTION

PATENT NO. : 6,414,777 B1  Page 1 of 1
DATED : July 2, 2002
INVENTOR(S) : Hideyuki Miyamoto It is certified that error appears in the above-identified patent and that said Letters Patent is hereby corrected as shown below:

Column 1,
Line 18, "medium." should read -- medium --; and
Line 30, "optical·box" should read -- optical box --.

Column 2,
Line 1, "magnetic" should read -- magnet -- ; and
Line 2, "lead" should read -- lead to --.

Column 4,
Line 40, "which·the" should read -- which the -- ; and
Line 53, "of he" should read -- of the --.

Column 5,
Line 1, "9 and 9B" should read -- 9A and 9B --;
Line 10, "at" should read -- at a --; and
Line 29, "via .a" should read -- via a --.

Column 10,
Line 1, "parallel" should read -- a parallel --.

Signed and Sealed this

Eighteenth Day of February, 2003

JAMES E. ROGAN
*Director of the United States Patent and Trademark Office*